US012436485B2

(12) United States Patent
Adachi et al.

(10) Patent No.: US 12,436,485 B2
(45) Date of Patent: Oct. 7, 2025

(54) HEATING DEVICE, FIXING DEVICE, AND IMAGE FORMING APPARATUS

(71) Applicants: Tomoya Adachi, Kanagawa (JP); Yuusuke Furuichi, Kanagawa (JP)

(72) Inventors: Tomoya Adachi, Kanagawa (JP); Yuusuke Furuichi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/263,152

(22) PCT Filed: Apr. 25, 2022

(86) PCT No.: PCT/IB2022/053800
§ 371 (c)(1),
(2) Date: Jul. 27, 2023

(87) PCT Pub. No.: WO2022/229813
PCT Pub. Date: Nov. 3, 2022

(65) Prior Publication Data

US 2024/0118648 A1 Apr. 11, 2024

(30) Foreign Application Priority Data

Apr. 30, 2021 (JP) ................................ 2021-077673

(51) Int. Cl.
*G03G 15/20* (2006.01)
*G03G 21/06* (2006.01)
*G03G 21/16* (2006.01)

(52) U.S. Cl.
CPC ..... *G03G 15/2017* (2013.01); *G03G 15/2053* (2013.01); *G03G 15/2057* (2013.01);
(Continued)

(58) Field of Classification Search
CPC .......... G03G 15/2017; G03G 15/2053; G03G 15/2057; G03G 15/206; G03G 15/2064;
(Continued)

(56) References Cited

U.S. PATENT DOCUMENTS

2006/0067750 A1* 3/2006 Inoue .................. G03G 15/206
399/328
2007/0053729 A1 3/2007 Yamada et al.
(Continued)

FOREIGN PATENT DOCUMENTS

CN 1928735 A 3/2007
JP H09-134085 A 5/1997
(Continued)

OTHER PUBLICATIONS

International Search Report and Written Opinion issued on Jul. 19, 2022 in PCT/IB2022/053800 filed on Apr. 25, 2022.
(Continued)

*Primary Examiner* — Joseph S Wong
(74) *Attorney, Agent, or Firm* — Harness, Dickey & Pierce, P.L.C.

(57) ABSTRACT

A heating device includes a planar heater, a heating rotator, a pressure rotator, and one or more charge eliminators. The planar heater includes a base and a resistive heat generator. The heating rotator contacts the heater and includes a conductive layer. The pressure rotator presses the heating rotator and has an outer surface including a conductive material. The one or more charge eliminators contact the conductive layer and the outer surface of the pressure rotator.

11 Claims, 6 Drawing Sheets

(52) U.S. Cl.
CPC ....... *G03G 15/206* (2013.01); *G03G 15/2064* (2013.01); *G03G 21/06* (2013.01); *G03G 21/1685* (2013.01); *G03G 2215/20* (2013.01); *G03G 2215/2003* (2013.01)

(58) Field of Classification Search
CPC ............... G03G 21/06; G03G 21/1685; G03G 2215/20; G03G 2215/2003
See application file for complete search history.

(56) References Cited

U.S. PATENT DOCUMENTS

| | | | | |
|---|---|---|---|---|
| 2019/0286026 | A1 | 9/2019 | Furuichi et al. | |
| 2019/0286027 | A1 | 9/2019 | Someya et al. | |
| 2020/0033776 | A1 | 1/2020 | Yoshinaga et al. | |
| 2020/0103796 | A1 | 4/2020 | Furuichi et al. | |
| 2020/0103799 | A1 | 4/2020 | Adachi et al. | |
| 2020/0103814 | A1 | 4/2020 | Someya et al. | |
| 2020/0174408 | A1 | 6/2020 | Furuichi et al. | |
| 2020/0249601 | A1 | 8/2020 | Inoue et al. | |
| 2020/0292972 | A1 | 9/2020 | Inoue et al. | |
| 2021/0003952 | A1 | 1/2021 | Ishida | |
| 2021/0278790 | A1 | 9/2021 | Furuichi et al. | |
| 2023/0205119 | A1* | 6/2023 | Fujiwara ............ | G03G 15/2053 399/330 |
| 2023/0221664 | A1* | 7/2023 | Fujiwara ............ | G03G 15/2053 399/328 |

FOREIGN PATENT DOCUMENTS

| | | | |
|---|---|---|---|
| JP | H11-282300 | A | 10/1999 |
| JP | 2002-162857 | A | 6/2002 |
| JP | 2002-244472 | A | 8/2002 |
| JP | 2009-093017 | A | 4/2009 |
| JP | 2013-113910 | A | 6/2013 |
| JP | 2015-084084 | A | 4/2015 |
| JP | 2015-114508 | A | 6/2015 |
| JP | 2017-156612 | A | 9/2017 |
| JP | 2021-012294 | A | 2/2021 |

OTHER PUBLICATIONS

JP Office Action for corresponding Japanese Patent Application No. 2021-077673 issued on Sep. 2, 2024.
CN Office Action for corresponding Chinese Patent Application No. 202280028659.0 issued on Jul. 29, 2025.

* cited by examiner

HEATING DEVICE, FIXING DEVICE, AND IMAGE FORMING APPARATUS

CROSS-REFERENCE TO RELATED APPLICATIONS

This application is a national phase under 35 U.S.C. § 371 of PCT International Application No. PCT/IB2022/053800 which has an International filing date of Apr. 25, 2022, which claims priority to Japanese Patent Application No. 2021-077673, filed Apr. 30, 2021, the entire contents of each of which are hereby incorporated by reference.

TECHNICAL FIELD

Embodiments of the present disclosure relate to a heating device, a fixing device, and an image forming apparatus.

BACKGROUND ART

A heating device in a fixing device includes a fixing belt as a heating rotator and a pressure roller as a pressure rotator. While a sheet passes through a fixing nip between the fixing belt and the pressure roller, toner on the sheet is heated and pressed.

A planar heater as a heating body that heats the fixing belt is disposed inside a loop of the fixing belt. The heater generates heat as an alternating current (AC) voltage is to a resistive heat generator on a base of the heater. The heater contacts an inner surface of the fixing belt via, for example, an insulating layer disposed in the heater to heat the fixing belt.

An image forming apparatus including such a fixing device may have several electrical problems.

For example, the surface layers of the fixing belt and the pressure roller are charged by passage of a charged sheet through the fixing nip or by frictional charging due to rotation of the fixing belt and the pressure roller. If such charging is not reduced, the toner image on the sheet is electrostatically offset in the fixing process, which causes an abnormal image. In particular, in a low-humidity environment or when an image is formed on a sheet whose surface has a high resistance due to a coating agent, the above-described problem is likely to occur.

Further, in a configuration in which an AC voltage is applied to the heater, an insulating layer in the heater and a rubber layer of the fixing belt are equivalent to capacitors, and an AC voltage is applied to the fixing nip via the fixing belt. When the sheet is in contact with both of the transfer nip and the fixing nip, the AC voltage is transmitted to the transfer nip via the sheet. As a result, the AC voltage affects the transfer electric field and causes periodic density unevenness in the transferred image, that is, a so-called banding image. For example, in particular, in a high-humidity environment or when a thin paper sheet is used as the sheet, the sheet having a low resistance, the above-described problem becomes significant.

For example, in Patent Literature (PTL) 1, a fixing entry guide is disposed upstream from a fixing nip in a sheet conveyance direction. A resistor and a capacitor are connected in parallel to the fixing entry guide, and the fixing entry guide is grounded via the resistor and the capacitor. Thus, the AC voltage flowing from the fixing belt toward the transfer nip through the paper can be made to flow to toward the fixing entry guide, and the occurrence of a banding image caused by the propagation of the AC voltage to the transfer side can be prevented.

However, the configuration of PTL 1 does not fully solve the electrical problems described above.

CITATION LIST

Patent Literature

[PTL 1]
Japanese Unexamined Patent Application Publication No. 2015-084084

SUMMARY OF INVENTION

Technical Problem

An object of the present disclosure is to solve an electrical problem occurring in a heating device and its periphery.

Solution to Problem

According to an embodiment of the present disclosure, a heating device includes a planar heater, a heating rotator, a pressure rotator, and one or more charge eliminators. The planar heater includes a base and a resistive heat generator. The heating rotator contacts the heater and includes a conductive layer. The pressure rotator presses the heating rotator and has an outer surface including a conductive material. The one or more charge eliminators contact the conductive layer and the outer surface of the pressure rotator.

Advantageous Effects of Invention

According to an embodiment of the present disclosure, an electrical problem occurring in the heating device or the periphery thereof can be prevented.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
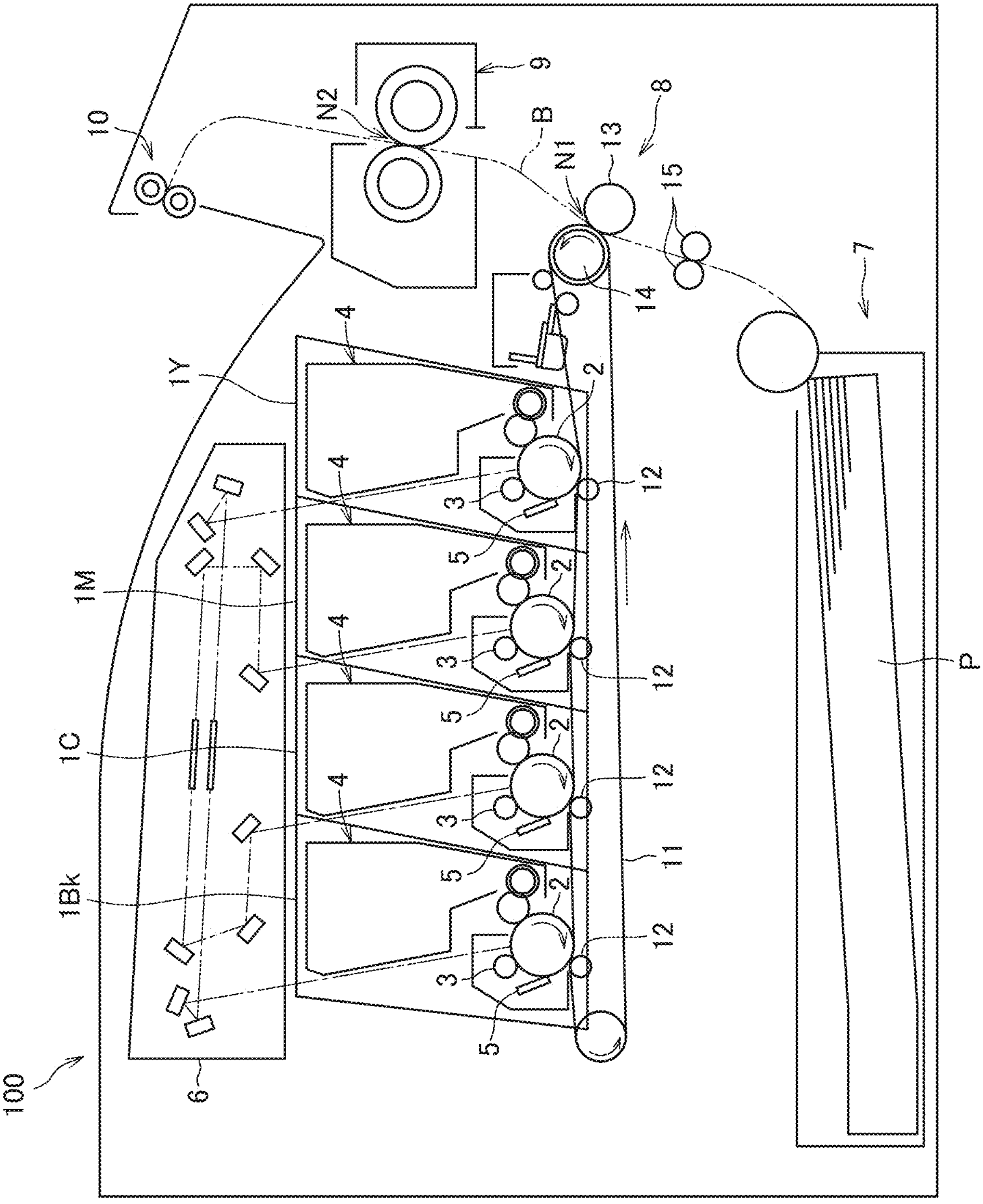
FIG. 1 is a schematic diagram illustrating a configuration of an image forming apparatus according to an embodiment of the present disclosure.

The terminology used herein is for the purpose of describing particular embodiments only and is not intended to be limiting of the present invention. As used herein, the singular forms “a”, “an” and “the” are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present disclosure are described below. Identical reference numerals are assigned to identical components or equivalents and descriptions of those components may be simplified or omitted. As one example of a heating device, the following describes a fixing device to fix a toner image onto a sheet.

The image forming apparatus 100 illustrated in FIG. 1 includes four image forming units 1Y, 1M, 1C, and 1Bk detachably attached to an apparatus body thereof. The image forming units 1Y, 1M, 1C, and 1Bk have substantially the same configuration except for containing different color developers, i.e., yellow (Y), magenta (M), cyan (C), and black (Bk) toners, respectively. The colors of the developers correspond to color separation components of full-color images. Each of the image forming units 1Y, 1M, 1C, and 1Bk includes a drum-shaped photoconductor 2 as an image bearer, a charging device 3, a developing device 4, and a cleaning device 5. The charging device 3 charges the surface of the photoconductor 2. The developing device 4 supplies toner as the developer to the surface of the photoconductor 2 to form a toner image. The cleaning device 5 cleans the surface of the photoconductor 2.

The image forming apparatus 100 includes an exposure device 6, a sheet feeding device 7, a transfer device 8, a fixing device 9 as a heating device, and a sheet ejection device 10. The exposure device 6 exposes the surface of the photoconductor 2 to form an electrostatic latent image on the surface of the photoconductor 2. The sheet feeding device 7 supplies a sheet P as a recording medium to a sheet conveyance path B. The transfer device 8 transfers toner images formed on the photoconductors 2 onto the sheet P. The fixing device 9 fixes the toner images transferred onto the sheet P to the surface of the sheet P. The sheet ejection device 10 ejects the sheet P outside the image forming apparatus 100. The image forming units 1Y, 1M, 1C, and 1Bk including the photoconductors 2, the charging devices 3, the exposure devices 6, the transfer device 8, and the like constitute an image forming device that forms an image on the sheet P.

The transfer device 8 includes an intermediate transfer belt 11 having an endless form and serving as an intermediate transferor, four primary transfer rollers 12 serving as primary transferors, a secondary transfer roller 13 serving as a secondary transferor, and a counter roller 14. The intermediate transfer belt 11 is stretched by a plurality of rollers. Each of the four primary transfer rollers 12 transfers the toner image on each of the photoconductors 2 onto the intermediate transfer belt 11. The secondary transfer roller 13 transfers the toner image transferred onto the intermediate transfer belt 11 onto the sheet P. The four primary transfer rollers 12 are in contact with the respective photoconductors 2 via the intermediate transfer belt 11. Thus, the intermediate transfer belt 11 contacts each of the photoconductors 2, forming a primary transfer nip therebetween. The secondary transfer roller 13 is in contact with the counter roller 14 via the intermediate transfer belt 11. Thus, a secondary transfer nip N1 as a nip portion or a transfer portion is formed between the secondary transfer roller 13 and the intermediate transfer belt 11. The counter roller 14 is a roller that stretches the intermediate transfer belt 11.

A timing roller pair 15 is disposed on a way of the sheet conveyance path B from the sheet feeding device 7 to the secondary transfer nip N1.

Referring to FIG. 1, a description is provided of printing processes performed by the image forming apparatus 100 described above.

When the image forming apparatus 100 receives an instruction to start printing, a driver drives and rotates the photoconductor 2 clockwise in FIG. 1 in each of the image forming units 1Y, 1M, 1C, and 1Bk. The charger 3 charges the surface of the photoconductor 2 uniformly at a high electric potential. Next, the exposure device 6 exposes the surface of each photoconductor 2 based on image data of the document read by a document reading device or print data instructed to be printed from a terminal. As a result, the potential of an exposed portion on the surface of each photoconductor 2 decreases, and an electrostatic latent image is formed on the surface of each photoconductor 2. The developing device 4 supplies toner to the electrostatic latent image formed on the photoconductor 2, forming a toner image thereon.

The toner image formed on each of the photoconductors 2 reaches the primary transfer nip at each of the primary transfer rollers 12 in accordance with rotation of each of the photoconductors 2. The toner images are sequentially transferred and superimposed onto the intermediate transfer belt 11 that is driven to rotate counterclockwise in FIG. 1 to form a full color toner image. Thereafter, the full color toner image formed on the intermediate transfer belt 11 is conveyed to the secondary transfer nip defined by the secondary transfer roller 13 in accordance with rotation of the intermediate transfer belt 11. The full color toner image is transferred onto the sheet P conveyed to the secondary transfer nip. The sheet P is supplied from the sheet feeding device 7. The timing roller pair 15 temporarily halts the sheet P supplied from the sheet feeding device 7. Thereafter, the timing roller pair 15 conveys the sheet P to the secondary transfer nip at a time when the full color toner image formed on the intermediate transfer belt 11 reaches the secondary transfer nip. Accordingly, the full color toner image is transferred onto and borne on the sheet P. After the toner image is transferred onto the intermediate transfer belt 11, the cleaning device 5 removes residual toner remained on the photoconductor 2 therefrom.

The sheet P transferred with the full color toner image is conveyed to the fixing device 9 that fixes the full color toner image on the sheet P. Thereafter, the sheet ejection device 10 ejects the sheet P onto the outside of the image forming apparatus 100, thus finishing a series of printing processes.

Next, the configuration of the fixing device is described in more detail.

Figure 2:
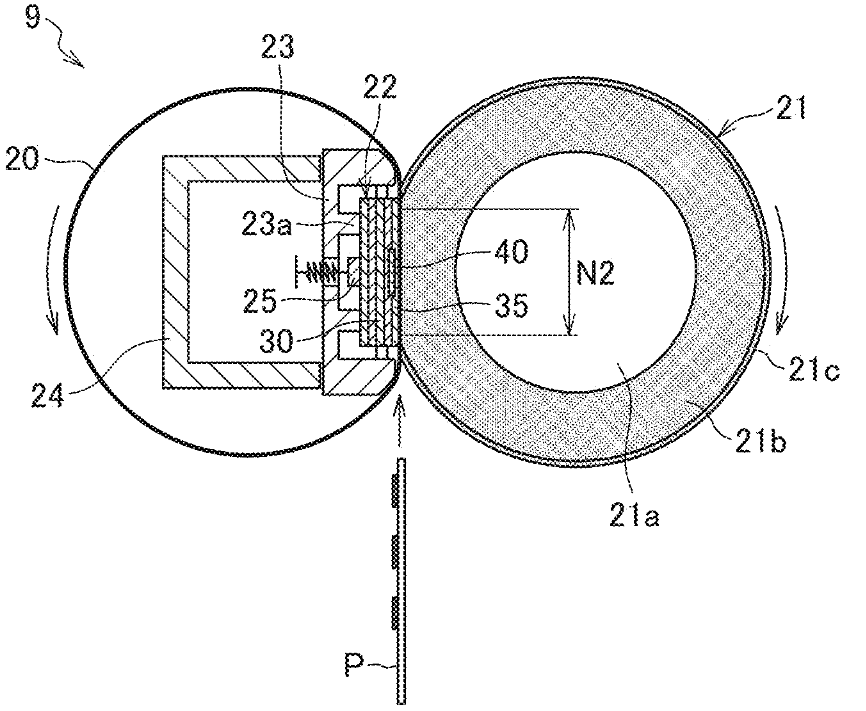
FIG. 2 is a schematic diagram illustrating a configuration of a fixing device according to an embodiment of the present disclosure.

As illustrated in FIG. 2, the fixing device 9 according to the present embodiment includes an endless fixing belt 20 as a fixing rotator or a fixing member, a pressure roller 21 as a pressure rotator or a pressure member, a heater 22 as a heating body, a heater holder 23 as a holder, a stay 24 as a support, and a thermistor 25 as a temperature detector. The pressure roller 21 is in contact with an outer peripheral surface of the fixing belt 20 to form a fixing nip N2 as a nip portion. The heater 22 heats the fixing belt 20. The heater holder 23 holds the heater 22. The stay 24 supports a back side of the heater holder 23. The fixing belt 20, the pressure roller 21, the heater 22, the heater holder 23, and the stay 24 extend in a direction perpendicular to the sheet surface of FIG. 2. Hereinafter, the direction is referred to as a longitudinal direction of each component or simply referred to as a longitudinal direction. The longitudinal direction is also an axial direction of the pressure roller 21 and also a width direction of the sheet P passing through the fixing device 9.

The fixing belt 20 includes a tubular base body that is made of polyimide (PI) and has an outer diameter of 25 mm and a thickness in a range of from 50 micrometers (μm) to 70 μm, for example. A release layer having a thickness of from 7 μm to 20 μm is formed on the outermost layer of the fixing belt 20. An elastic layer made of rubber and having a thickness of 100 μm to 300 μm is disposed between the base body and the release layer. The base body of the fixing belt 20 may be made of heat resistant resin such as polyetheretherketone (PEEK) or metal such as nickel (Ni) and steel use stainless (SUS) stainless steel, instead of polyimide. The inner surface of the fixing belt 20 may be coated with, for example, polyimide or polytetrafluoroethylene (PTFE). The fixing belt 20 is a heated member to be heated by the heater 22 and is a heating member that heats (toner on) the sheet in the fixing nip N2.

The pressure roller 21 has an outer diameter of 25 mm, for example. The pressure roller 21 includes a core 21*a*, an elastic layer 21*b*, and a release layer 21*c*. The core 21*a* is a solid core made of iron. The elastic layer 21*b* coats the circumferential surface of the core 21*a*. The elastic layer 21*b* is made of silicone rubber and has a thickness of from 3.5 mm to 4.0 mm, for example. The release layer 21*c* coats an outer circumferential surface of the elastic layer 21*b*. Preferably, the release layer 21*c* is a fluororesin layer having, for example, a thickness of from approximately 30 μm to approximately 50 μm to enhance releasability of the surface of the pressure roller 21.

The pressure roller 21 is biased toward the fixing belt 20 by a biasing member and pressed against the heater 22 via the fixing belt 20. Thus, the fixing nip N2 is formed between the fixing belt 20 and the pressure roller 21. Additionally, a driver drives and rotates the pressure roller 21. As the pressure roller 21 rotates in a direction indicated by arrow in FIG. 2, the rotation of the pressure roller 21 drives the fixing belt 20 to rotate in a direction indicated by arrow in FIG. 2 due to frictional force therebetween.

The heater 22 is a planar heater extending in a longitudinal direction. The heater 22 heats the inner surface of the fixing belt 20 by heat generation of resistive heat generators 40 on the base 30. A detailed configuration of the heater 22 is described later.

The heater holder 23 and the stay 24 are disposed inside a loop of the fixing belt 20. The stay 24 is made of a metal channel member, and both side plates of the fixing device 9 support both ends of the stay 24. The stay 24 supports the heater holder 23 and the heater 22 held by the heater holder 23. Accordingly, the heater 22 reliably receives a pressing force of the pressure roller 21 pressed against the fixing belt 20 and stably forms the fixing nip N2 between the fixing belt 20 and the pressure roller 21.

Since the heater holder 23 is heated to a high temperature by heat from the heater 22, the heater holder 23 is preferably made of a heat resistant material. The heater holder 23 made of heat-resistant resin having low thermal conduction, such as a liquid crystal polymer (LCP), reduces heat transfer from the heater 22 to the heater holder 23, thus allowing the heater 22 to effectively heat the fixing belt 20.

The heater holder 23 has a protrusion 23*a* that is partially disposed in the short direction of the heater holder 23 and protrudes toward the heater 22. The heater holder 23 contacts the heater 22 at the protrusion 23*a*. Providing the protrusion 23*a* reduces the contact area of the heater holder 23 with the heater 22, thus allowing a reduction in the amount of heat transferred from the heater 22 to the heater holder 23. However, in some embodiments, the entire surface of the heater holder 23 in the lateral direction may contact the heater 22 without providing the protrusion 23*a* in the heater holder 23. Such a configuration can increase the amount of heat transfer from the heater 22 to the heater holder 23 and reduce the temperature increase of the heater 22 and the fixing belt 20.

The thermistor 25 is in contact with the back surface of the base 30 to detect the temperature of the base 30.

When the fixing device 9 according to the present embodiment starts a print operation, the pressure roller 21 is driven to rotate, and the rotation of the pressure roller 21 rotates the fixing belt 20 as illustrated in FIG. 2. As power is supplied to the resistive heat generators 40 of the heater 22, the heater 22 heats the fixing belt 20. After the temperature of the fixing belt 20 reaches a predetermined target temperature (i.e., fixing temperature), the sheet P bearing an unfixed toner image is conveyed to the fixing nip N2 between the fixing belt 20 and the pressure roller 21. As a result, the unfixed toner image is heated and pressed to be fixed on the sheet P.

Figure 3A:
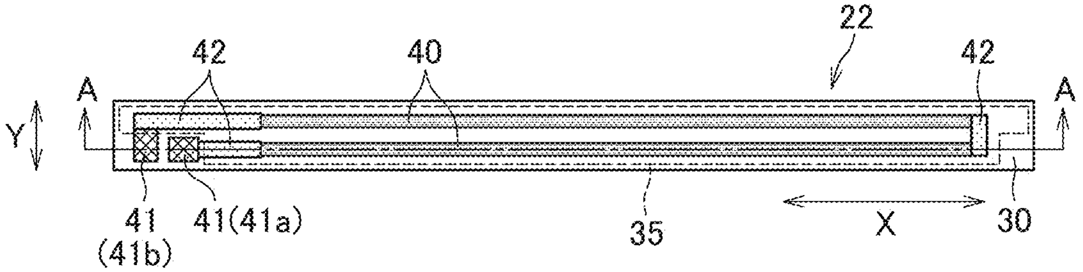
FIG. 3A is a plan view of a heater according to an embodiment of the present disclosure.
Figure 3B:
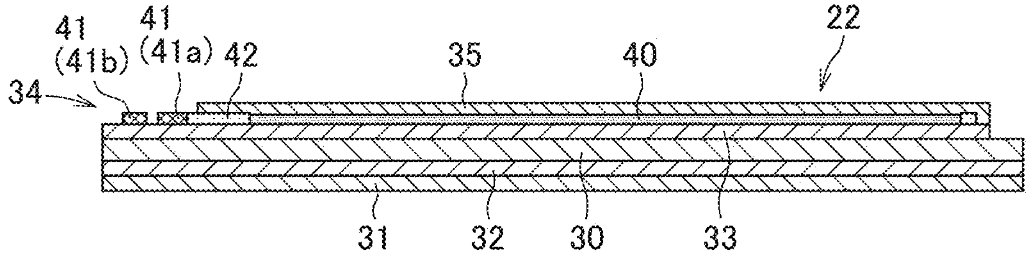
FIG. 3B is a cross-sectional view of the heater taken along line A-A of FIG. 3A.

Next, a more detailed configuration of the heater 22 is described with reference to FIG. 3. FIG. 3A is a plan view of the heater 22. FIG. 3B is a cross-sectional view of the heater 22 taken along line A-A of FIG. 3A.

The heater 22 includes, in order from the heater holder 23 side (left side in FIG. 2), a first insulating protective layer 31, a first insulating glass layer 32, the base 30, a second insulating protective layer 33, a conductor layer 34, and a second insulating glass layer 35.

The base 30 is a plate-shaped member extending in the longitudinal direction. In the present embodiment, the base 30 is set to have a longitudinal dimension of 270 mm, a short-directional dimension of 8 mm, and a height of 0.3 mm. The longitudinal direction of the heater 22 is a direction indicated by a double-headed arrow X in FIG. 3A, and the short direction of the heater 22 is a direction indicated by a double-headed arrow Y in FIG. 3A. The short direction of the heater 22 is a direction along the surface of the base 30 on which the resistive heat generators 40 are disposed, and is a direction intersecting (in the present embodiment, a direction orthogonal to) the longitudinal direction of the heater 22.

The base 30 is made of stainless steel in the present embodiment. In some embodiments, the base 30 may be made of an iron-based alloy, an aluminum alloy, or a copper alloy. Alternatively, the base 30 may be made of ceramic such as alumina or aluminum nitride.

The conductor layer 34 is formed on the base 30 via the second insulating protective layer 33. Such a configuration ensures insulation between the conductor layer 34 and the base 30.

The conductor layer 34 is provided with the resistive heat generators 40, electrodes 41*a* and 41*b* (collectively referred to as electrodes 41 unless distinguished), and power supply lines 42.

The resistive heat generator 40 is produced by, for example, mixing silver-palladium (AgPd), glass powder, and the like into a paste. The paste is coated on the base 30 by screen printing or the like. Thereafter, the base 30 is fired to form the resistive heat generator 40. The resistive heat generators 40 each have a resistance value of 10Ω at room temperature, in the present embodiment. The material of the resistive heat generators 40 may contain a resistance material, such as silver alloy (AgPt) or ruthenium oxide ($RuO_2$), other than the above material. Silver (Ag), silver palladium (AgPd) or the like may be used as a material of the power supply lines 42 and the electrodes 41. Screen-printing such a material forms the power supply lines 42 and the electrodes 41. The power supply lines 42 are made of conductors having an electrical resistance value smaller than the electrical resistance value of the resistive heat generators 40.

The first insulating protective layer 31, the first insulating glass layer 32, the second insulating protective layer 33, the conductor layer 34, and the second insulating glass layer 35 are made of heat-resistant glass having a thickness of, for example, 75 μm.

The second insulating glass layer 35 covers the resistive heat generators 40 and the power supply lines 42 to insulate and protect the resistive heat generators 40 and the power supply lines 42 and maintain sliding properties with the fixing belt 20. The electrodes 41 are not covered with the second insulating glass layer 35.

Figure 4:
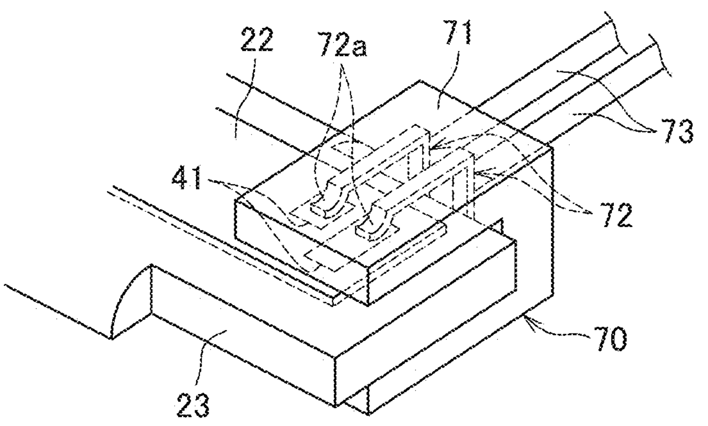
FIG. 4 is a perspective view of a connector attached to the heater of FIG. 3A and a heater holder.

FIG. 4 is a perspective view of a connector 70 attached to the heater 22 and the heater holder 23. As illustrated in FIG. 4, the connector 70 includes a housing 71 made of resin and a contact terminal 72 anchored to the housing 71. The contact terminal 72 is a flat spring. The contact terminal 72 includes a pair of contacts 72*a* that contacts the electrodes 41 of the heater 22, respectively. The contact terminal 72 of the connector 70 is connected to a harness 73 that supplies power.

The connector 70 is attached to the heater 22 and the heater holder 23 such that the front sides of the heater 22 and the heater holder 23 and the back sides of the heater 22 and the heater holder 23 are sandwiched by the connector 70. Accordingly, each contact 72*a* of the contact terminal 72 elastically contacts (press-contacts) the electrode 41. As a result, the resistive heat generators 40 and a power supply disposed in the image forming apparatus are electrically connected via the connector 70, and power can be supplied from the power supply to the resistive heat generators 40.

Figure 5:
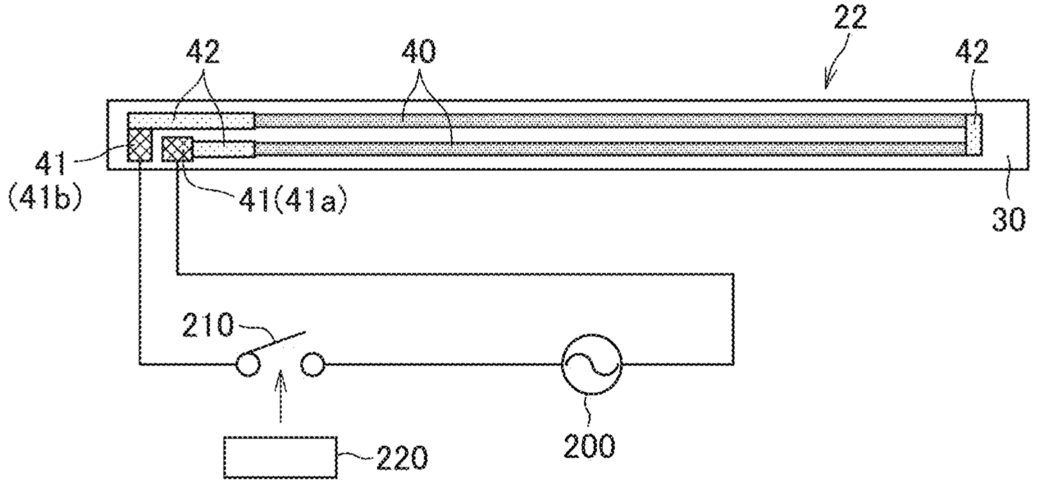
FIG. 5 is a schematic diagram illustrating a circuit to supply power to the heater.

FIG. 5 is a schematic diagram illustrating a circuit to supply power to the heater according to the present embodiment.

As illustrated in FIG. 5, an AC power supply 200 is electrically connected to the electrodes 41 of the heater 22 to constitute a power supply circuit in the present embodiment to supply power to the resistive heat generators 40.

A switch 210 is disposed between the AC power supply 200 and the electrode 41 (the electrode 41B in FIG. 5). The power supply to the resistive heat generators 40 can be switched by turning on and off the switch 210.

A controller 220 controls energization of the resistive heat generators 40 based on the temperature detected by the thermistor 25 (see FIG. 2) and also in consideration of the amount of heat transfer to the sheet during sheet passing. The controller 220 includes a microcomputer including, for example, a central processing unit (CPU), a read only memory (ROM), a random access memory (RAM), an input and output (I/O) interface. In the present embodiment, the controller 220 is disposed in an apparatus body of the image forming apparatus 100. However, in some embodiments, the controller may be disposed in the fixing device.

By the way, in an image forming apparatus including the above-described fixing device, an electrical problem might occur and cause an abnormal image.

For example, when the sheet P charged in the secondary transfer process passes through the fixing nip N2, the surface layers of the fixing belt 20 and the pressure roller 21 are charged.

In addition, the surfaces of the fixing belt 20 and the pressure roller 21 are frictionally charged by the rotation of both the fixing belt 20 and the pressure roller 21. When the sheet P passes through the fixing nip N2 in a state where the surface layers of the fixing belt 20 and the pressure roller 21 are charged, the toner image on the sheet P may be electrostatically offset, which causes an abnormal image. In particular, in a low-humidity environment or when an image is formed on a sheet whose surface has a high resistance due to a coating agent, the above-described problem is likely to occur.

Figure 6:
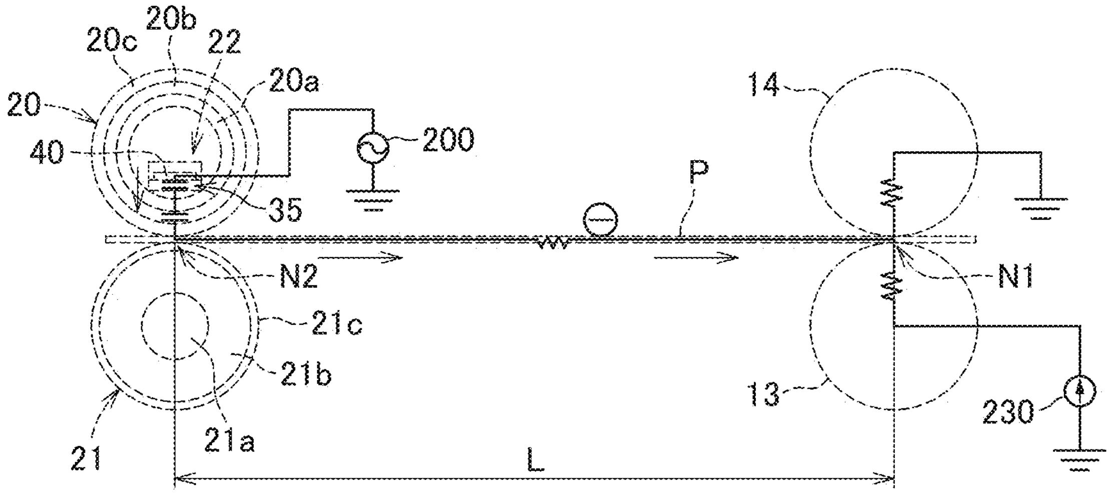
FIG. 6 is a diagram illustrating propagation of an AC voltage from a fixing nip to a transfer nip in a fixing device different from the fixing device of FIG. 2.

Further, in the fixing device 9 of the present embodiment in which the AC voltage is applied to the heater 22, the insulating layer in the heater 22 and the rubber layer of the fixing belt are equivalent to the capacitors. Accordingly, in the configuration in which the heater 22 and the fixing belt 20 are in physical contact with each other, an AC voltage is applied to the fixing nip N2 via the fixing belt 20. As illustrated in FIG. 6, in a state where the sheet P is in contact with both the transfer nip N1 and the fixing nip N2, the AC voltage is transmitted to the transfer nip N1 via the sheet P (see the direction indicated by an arrow in FIG. 6). The AC voltage affects the transfer electric field to cause periodic density unevenness in the transferred image, that is, a so-called banding image. In particular, in a case where the sheet P has low resistance, for example, in a high-humidity environment or when a thin paper sheet is used as the sheet P, the above-described problem is likely to occur. The above-described problem is also likely to occur in an area where the AC power supply is 220 V to 240 V. The problem of the banding image is likely to occur when the length of the sheet P in the sheet conveyance direction is greater than the sheet conveyance distance L between (the center position of) the transfer nip N1 and (the center position of) the fixing nip N2. For convenience, FIG. 6 illustrates a case where the transfer nip N1 and the fixing nip N2 are arranged on a straight line. However, the arrangement is not limited to the straight line, and the path between the transfer nip and the fixing nip may be bent in the middle. In such a case, the sum of the distances by which the sheet is conveyed between both nips is defined as a conveyance distance L. FIG. 6 also illustrates a fixing device having a configuration in which a charge eliminator according to an embodiment described below is not disposed. A secondary transfer power supply 230 is connected to the secondary transfer roller 13.

Next, the configuration of the fixing device according to the present embodiment is described with respect to the above-described electrical problem.

As illustrated in FIG. 6, the fixing belt 20 includes a base body 20*a* as a conductive layer, an elastic layer 20*b*, and a release layer 20*c* from the inner side of the fixing belt 20. An inner surface of the base body 20*a* constitutes an inner peripheral surface of the fixing belt 20. An outer surface of the release layer 20*c* constitutes an outer peripheral surface of the fixing belt 20. The release layer 20*c* according to the present embodiment is a non-conductive layer made of perfluoroalkoxy alkane (PFA) from the viewpoint of enhancing durability and ensuring releasability. Alternatively, fluororesin such as PTFE may be used as the release layer 20*c*.

The release layer 21*c* of the pressure roller 21 is a conductive layer made of PFA with a conductive filler such as carbon. The outer surface of the release layer 21*c* constitutes the outer peripheral surface of the pressure roller 21. The outer peripheral surface of the pressure roller 21 is set to have a surface resistivity of $1\times10^8\Omega$ per square or less. The surface resistivity was measured using a high resistance resistivity meter (product name: Hiresta IP [MCP-HT450] manufactured by Mitsubishi Chemical Analytech Co., Ltd.) under the following conditions.

Figure 7:
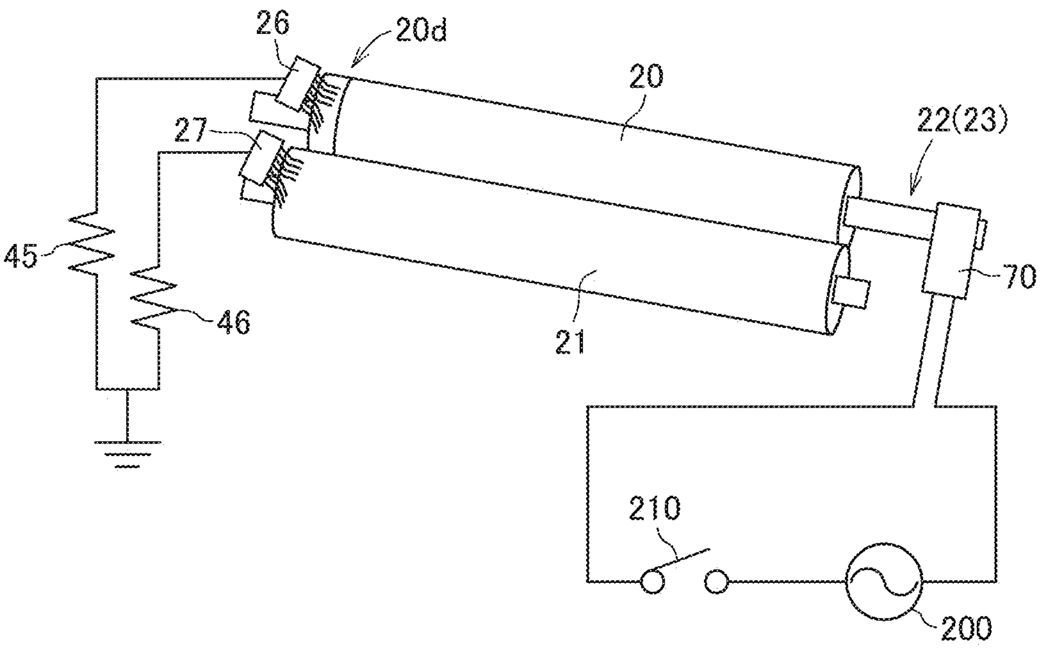
FIG. 7 is a perspective view of charge eliminators in contact with the fixing belt and the pressure roller.

Probe used: Type HA (two-pin type: 20-mm pitch)
Measurement mode: ρs
Measurement time: 10 seconds
Applied voltage: 250 V
Measurement location: a total of 12 locations that includes four locations in the circumferential direction (at intervals of 90°) and three locations in the axial direction (at the center and positions of 20 mm inward from both ends)
Surface resistivity: average value of the total of 12 locations As illustrated in FIG. 7, an exposed portion 20*d* is disposed on one longitudinal end of the fixing belt 20. The exposed portion 20*d* is a portion of the fixing belt 20 in which the elastic layer 20*b* and the release layer 20*c* are not provided and the base body 20*a* as a conductive layer is exposed to the outside. The exposed portion 20*d* is disposed outside a sheet passing region in the longitudinal direction and is disposed in a range of 5 mm from one end of the fixing belt 20 in the present embodiment.

A first charge eliminating brush 26 as a charge eliminator contacts the exposed portion 20*d* of the fixing belt 20. A second charge eliminating brush 27 as a charge eliminator contacts the outside of the sheet passing region on one longitudinal end of the pressure roller 21. In the present embodiment, the first charge eliminating brush 26 and the second charge eliminating brush 27 are made of stainless steel.

The first charge eliminating brush 26 is grounded through a first resistor 45. The second charge eliminating brush 27 is grounded through a second resistor 46. The resistance value of the first resistor 45 is set to $3\times10^6\Omega$ or less. The second resistor 46 is set in a range of $1.1\times10^3$ to $160\times10^6\Omega$.

In the present embodiment, the charges on the surface layers of the fixing belt 20 and the pressure roller 21 are removed by the second charge eliminating brush 27 through the surface layer of the pressure roller 21. Such a configuration can restrict charging of the surface layers of the fixing belt 20 and the pressure roller 21 and prevent electrostatic offset of the toner image on the sheet P in the fixing process.

In the above-described configuration, the second charge eliminating brush 27 is in contact with the surface layer of the pressure roller 21. In the state in which the sheet P is in contact with both the transfer nip N1 and the fixing nip N2 (see FIG. 6), a secondary transfer current may leak from the secondary transfer roller 13 to the ground via the sheet P, the pressure roller 21, and the second charge eliminating brush 27. Accordingly, an electric field necessary for the secondary transfer may not be obtained, and a secondary transfer failure may occur. In particular, in an environment where the relative humidity is high, the resistance value of the sheet P decreases, and such a problem is likely to occur.

On the other hand, in the present embodiment, the second charge eliminating brush 27 is grounded via the second resistor 46, so that the current flowing to the second charge eliminating brush 27 is restricted and the leakage of the secondary transfer current is restricted.

The larger the resistance value of the second resistor 46 is, the more the leakage of the secondary transfer current can be restricted. However, on the other hand, as the resistance value of the second resistor 46 is larger, the charge elimination performance with respect to the surface layers of the fixing belt 20 and the pressure roller 21 is lower. Therefore, it is preferable to set an appropriate resistance value for the second resistor 46 in consideration of the balance therebetween.

For this reason, in the present embodiment, the resistance value of the sheet actually used in the image forming apparatus is measured, and the resistance value of the second resistor 46 is set based on the measurement result. To be specific, plain paper copier (PPC) sheets of a plurality of brands were left for 24 hours or more in an environment of 27° C. and 80% RH (relative humidity). Then, the surface resistivity was measured with a Type HA probe using a measuring instrument of Hiresta IP (MCP-HT450) manufactured by Mitsubishi Chemical Analytech Co., Ltd. As a result, the sheet had the lowest resistivity of $100\times10^6\Omega$ per square, which is a value obtained by application of 100 V for 10 seconds. Therefore, the resistance value per 1 mm of the sheet in the conveyance direction is $1\times10^6$ Ω/mm Since the length L in FIG. 6 is 80 mm, the resistance value of the paper sheet is $80\times10^6\Omega$.

In the present embodiment, the resistance value of the second resistor 46 is set in a range of 0.5 times to two times the resistance value of the paper sheet in consideration of the balance described above. That is, it is preferable that the resistance value of the second resistor 46 is set in a range larger than $40\times10^6\Omega$ and smaller than $160\times10^6\Omega$, and specifically set to $100\times10^6\Omega$. Such a configuration can prevent the leakage of the secondary transfer current and obtain an appropriate charge elimination performance with respect to the surface layers of the fixing belt 20 and the pressure roller 21.

Assuming that the resistance value per 1 mm of the sheet is $1\times10^6$ Ω/mm and the interval between the transfer nip and the fixing nip is L mm, the resistance value R2 Ω of the second resistor 46 can be set so as to satisfy the following expression (1). Such a configuration can prevent the leakage of the secondary transfer current toward the second resistor 46 as described above and ensure the charge elimination performance with respect to the surface layers of the fixing belt 20 and the pressure roller 21.

$$0.5\times L\times1\times10^6<R2<2\times L\times1\times10^6 \quad \text{Expression 1}$$

The resistance value R2 Ω of the second resistor 46 may be set according to the following expression (2), where RA Ω/mm represents the resistance value per 1 mm of the sheet in the conveyance direction. Such a configuration can prevent the leakage of the secondary transfer current toward the second resistor 46 and ensure the charge elimination performance with respect to the surface layers of the fixing belt 20 and the pressure roller 21.

$$0.5\times L\times RA<R2<2\times L\times RA \quad \text{Expression 2}$$

Figure 8:
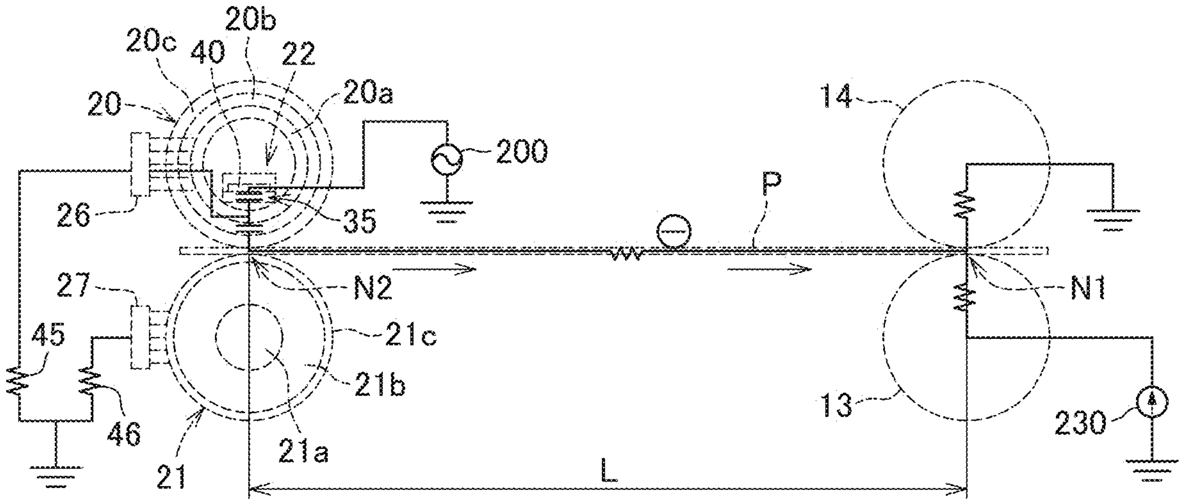
FIG. 8 is a schematic view of the charge eliminators in contact with the fixing belt and the pressure roller.

Further, in the present embodiment, as illustrated in FIG. 8, the first charge eliminating brush 26 contacts the base body 20*a* of the fixing belt 20 disposed between the heater 22 and the surface layer of the fixing belt 20. Accordingly, a part of the AC components (50 Hz) of the AC power supply 200 that propagates from the resistive heat generators 40 of the heater 22 to the transfer nip N1 via the fixing belt 20 and the sheet P can be escaped to the ground side via the first charge eliminating brush 26. That is, the above-described configuration can restrict the propagation of AC components from the resistive heat generator 40 to the secondary transfer nip N1 via the second insulating glass layer 35, the fixing belt 20 (the cylindrical base body 20*a*, the elastic layer 20*b*. and the release layer 20*c*), and the sheet P, and propagate the AC components from the resistive heat generator 40 to the first charge eliminating brush 26 via the second insulating glass layer 35, the cylindrical base body 20*a*, and the first charge eliminating brush 26 to escape the AC components to the ground side. Thus, the occurrence of the banding image can be prevented.

As described above, the first charge eliminating brush 26 and the second charge eliminating brush 27 according to the present embodiment can solve the electrical problem in the fixing device 9 and the transfer device in the vicinity of the fixing device 9.

Considering that the capacitive reactance Xc of the second insulating glass layer 35 of the heater 22 is $5\times10^6$ to $12\times10^6\Omega$, the resistance value of the first resistor 45 is preferably set to $3\times10^6\Omega$ or less. Thus, the propagation of the AC component to the secondary transfer side can be restricted. Particularly, in the present embodiment, the resistance value of the first resistor 45 is set to $3\times10^6\Omega$.

As described above, in the present embodiment, the first charge eliminating brush 26 and the second charge eliminating brush 27 are grounded via the first resistor 45 and the second resistor 46, respectively, which are different from each other, and thus can be grounded via the resistance values necessary for the respective brushes. Therefore, the above-described electrical problem can be appropriately prevented. In particular, the second resistor 46 needs to have a larger resistance value in order to prevent leakage of current from the secondary transfer side. For this reason, the resistance value of the second resistor 46 is set to be larger than the resistance value of the first resistor 45 as described above. However, the resistance values obtained for the first resistor 45 and the second resistor 46 change in accordance with the conveyance distance L of the sheet, the capacitive reactance Xc of the second insulating glass layer 35, and the like.

Figure 9:
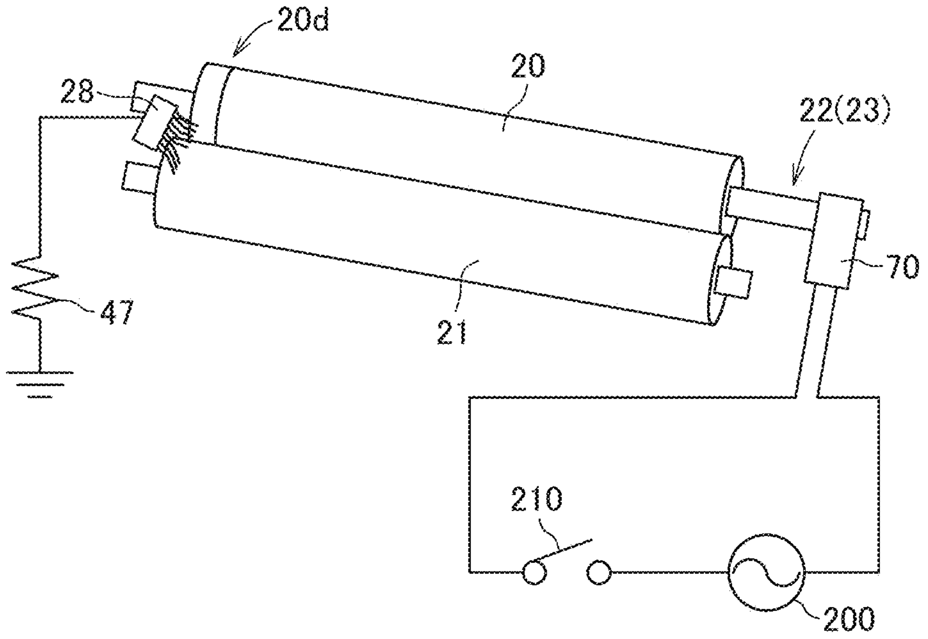
FIG. 9 is a perspective view of a charge eliminator according to an embodiment of the present disclosure.

In addition, when the first resistor 45 and the second resistor 46 can be set to the same resistance value, a single charge eliminating brush may be brought into contact with the fixing belt 20 and the pressure roller 21. That is, as illustrated in FIG. 9, a single charge eliminating brush 28 may be in contact with the exposed portion 20*d* of the fixing belt 20 and the outer peripheral surface of the pressure roller 21. The charge eliminating brush 28 is grounded via a resistor 47.

The above-described embodiments are illustrative and do not limit this disclosure. It is therefore to be understood that within the scope of the appended claims, numerous additional modifications and variations are possible to this disclosure otherwise than as specifically described herein.

In the above description, the fixing belt 20 is provided with the exposed portion 20*d* in which the base body 20*a* as a conductive layer is exposed to the outside. The first charge eliminating brush 26 contacts the exposed portion 20*d*. However, in some embodiments, the exposed portion 20*d* may not be provided in the fixing belt 20. For example, the charge eliminator may be brought into contact with the inner surface of the cylindrical base body 20*a* that is the inner surface of the fixing belt 20.

Figure 10:
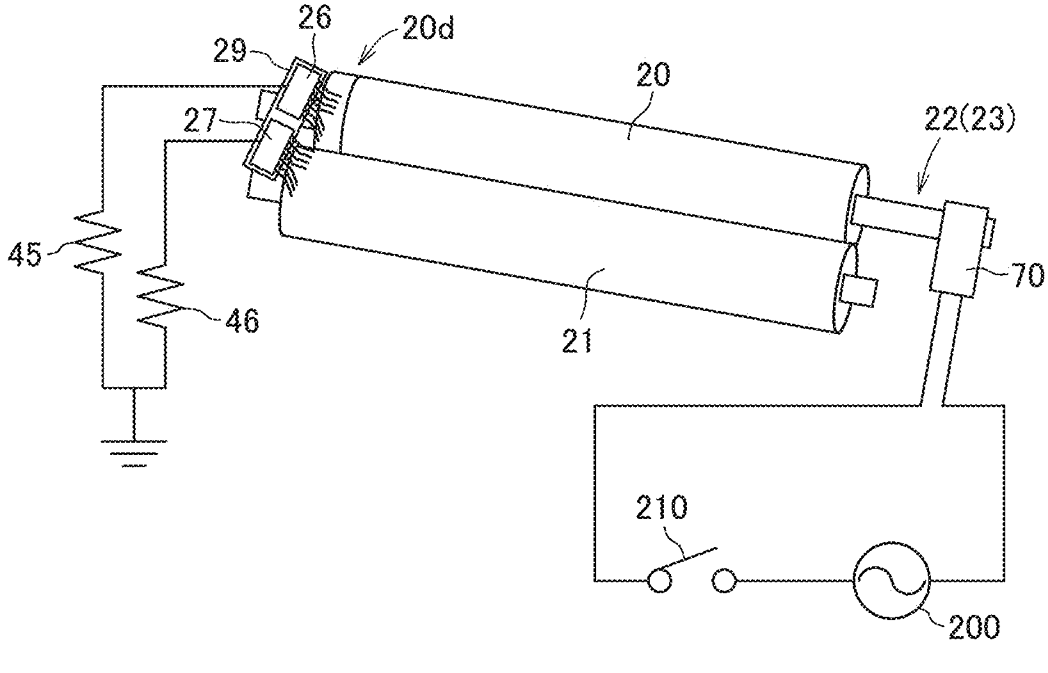
FIG. 10 is a perspective view of a fixing device including a holding member that holds charge eliminators, according to an embodiment of the present disclosure.

As in a fixing device 9 illustrated in FIG. 10, the first charge eliminating brush 26 and the second charge eliminating brush 27 may be held by a common holding portion 29. The holding portion 29 is formed of an insulating sheet.

Figure 11:
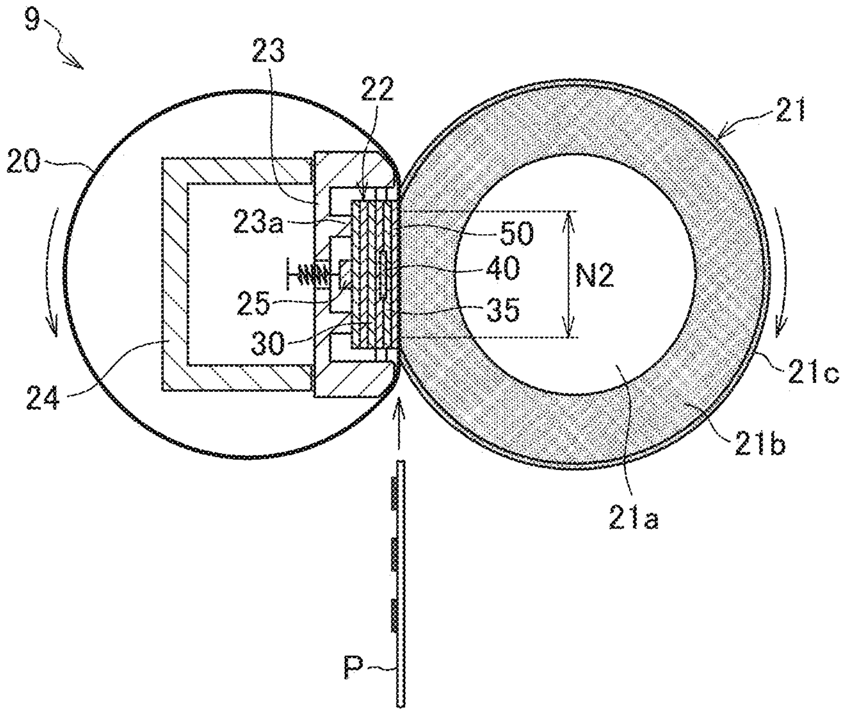
FIG. 11 is a cross-sectional side view of a fixing device including a soaking plate, according to an embodiment of the present disclosure.

In the above description, the second insulating glass layer 35 of the heater 22 directly contacts the inner surface of the fixing belt 20 in the above description. However, in some embodiments, another conductive member may be interposed between the second insulating glass layer 35 and the fixing belt 20. For example, as illustrated in FIG. 11, a fixing device 9 according to an embodiment of the present disclosure includes a soaking plate 50 as a high thermal conductive member between the second insulating glass layer 35 and the fixing belt 20.

The soaking plate 50 is a member that contacts the fixing belt 20 from the inner peripheral surface side of the fixing belt 20. The soaking plate 50 is made of a member having a higher thermal conductivity than the thermal conductivity of the base 30. In the present embodiment, aluminum is used as the material of the soaking plate 50, and the heat conductivity of the soaking plate 50 is set to approximately 236 W/m·K, for example. In addition, SUS (having a heat conductivity of 16.7 to 20.9 W/m·K) or a copper-based material (having a heat conductivity of, for example, 381 W/m·K) may be used for the soaking plate 50.

Next, a method of calculating the thermal conductivity is described. In order to calculate the thermal conductivity, the thermal diffusivity of an object to be measured is firstly measured. Using the thermal diffusivity, the thermal conductivity is calculated.

The thermal diffusivity is measured using a thermal diffusivity-and-conductivity measuring device (product name: ai-Phase Mobile 1u, manufactured by ai-Phase Co., Ltd.).

In order to convert the thermal diffusivity into thermal conductivity, values of density and specific heat capacity are necessary.

The density is measured by a dry automatic densitometer (product name: Accupyc 1330 manufactured by Shimadzu Corporation).

The specific heat capacity is measured by a differential scanning calorimeter (product name: DSC-60 manufactured by Shimadzu Corporation), and sapphire is used as a reference material in which the specific heat capacity is known. In the present embodiment, the specific heat capacity is measured five times, and an average value at 50° C. is used. The thermal conductivity $\lambda$ is obtained by the following expression (3), where $\rho$ is the density, C is the specific heat capacity, and a is the thermal diffusivity obtained by the thermal diffusivity measurement described above.

$$\lambda=\rho\times C\times\alpha \qquad \text{Expression 3}$$

The soaking plate 50 contacting the fixing belt 20 along the longitudinal direction allows the heat of the fixing belt 20 to move in the longitudinal direction and be equalized. Such a configuration can reduce temperature unevenness of the fixing belt 20 in the longitudinal direction.

Also in such a fixing device, the charge eliminating brush may be disposed in the same manner as described above, thus preventing the electrical problem from occurring in the fixing device and the periphery thereof, as in the above-described embodiment.

An image forming apparatus according to an embodiment of the present disclosure may be not only a color image forming apparatus as illustrated in FIG. 1 but also, for example, a monochrome image forming apparatus, a copier, a printer, a facsimile machine, or a multifunction peripheral including at least two functions of the copier, printer, and facsimile machine.

Figure 12:
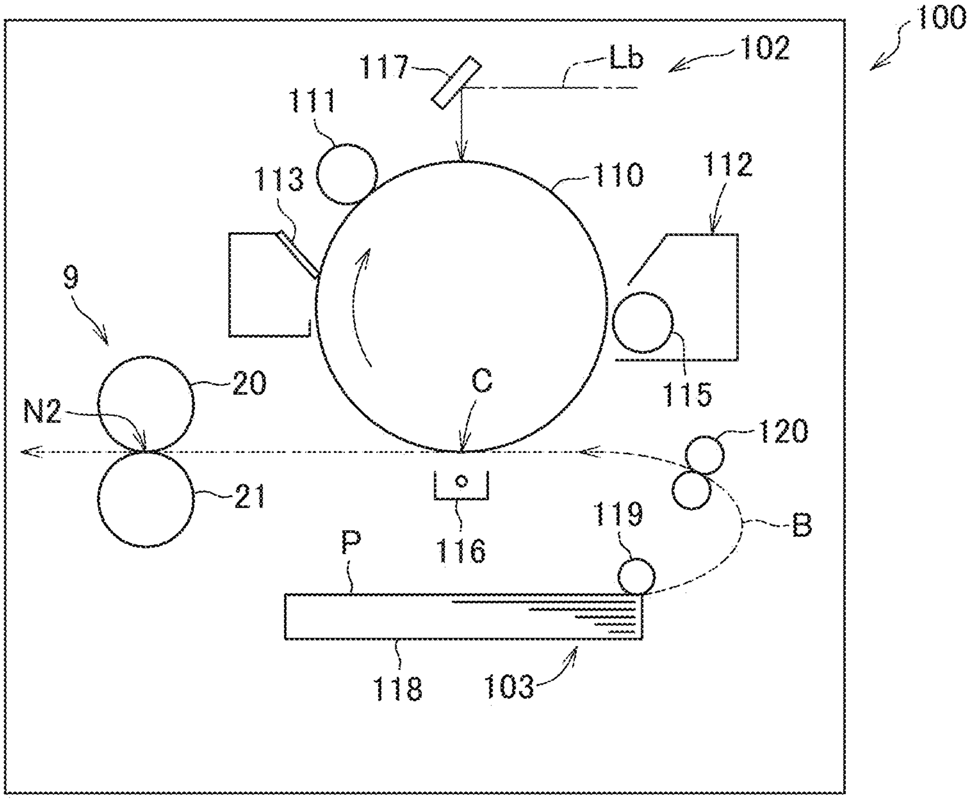
FIG. 12 is a schematic diagram illustrating a configuration of a monochrome image forming apparatus according to an embodiment of the present disclosure.

For example, a monochrome image forming apparatus 100 illustrated in FIG. 12 includes a photoconductor 110. A charging roller 111, a developing device 112, a cleaning blade 113, and the like are disposed around the photoconductor 110. The developing device 112 includes, for example, a developing roller 115. A transfer device 116 is disposed at a position facing the photoconductor 110 across a sheet conveyance path B. A position where the photoconductor 110 and the transfer device 116 face each other is a transfer portion C.

The image forming apparatus 100 further includes an exposure device 102, a sheet feeding device 103, and a fixing device 9. The exposure device 102 includes a mirror 117. The sheet feeding device 103 includes a sheet feeding tray 118 and a sheet feeding roller 119. The photoconductor 110, the charging roller 111, the developing device 112, the transfer device 116, the fixing device 9, and the like constitute an image forming device that forms an image on a sheet.

Next, a description is given of a basic operation of the image forming apparatus 100 with reference to FIG. 12.

When an image forming operation is started, first, the charging roller 111 charges the surface of the photoconductor 110. Then, the exposure device 102 irradiates the photoconductor 110 with a laser beam Lb based on the image data. An electric potential decreases at a portion of the photoconductor 110 irradiated with the laser beam Lb, and an electrostatic latent image is formed on the portion of the photoconductor 110. The developing device 112 supplies toner to the electrostatic latent image formed on the surface of photoconductor 110 to visualize the electrostatic latent image into a toner image, that is, a developer image. The transfer device 116 transfers the toner image onto the sheet P, and the cleaning blade 113 removes the toner remaining on the photoconductor 110 from the surface of the photoconductor 110.

On the other hand, as the image forming operation starts, the sheet feeding roller 119 of the sheet feeding device 103 disposed in the lower portion of the image forming apparatus 100 is driven and rotated to feed the sheet P from the sheet feeding tray 118 to the sheet conveyance path B.

The registration rollers 120 are controlled to convey the sheet P fed to the sheet conveyance path B to the transfer portion C such that the sheet P faces the toner image on the photoconductor 110. The transfer device 116 applies a transfer bias to the photoconductor 110 to transfer the toner image onto the surface of the sheet P conveyed to the transfer portion C.

The sheet P bearing the toner image is conveyed to the fixing device 9. The heated fixing belt 20 and the pressure roller 21 heat and press the sheet P to fix the toner image onto the surface of the sheet P. The sheet P on which the toner image has been fixed is separated from the fixing belt 20, conveyed by a pair of conveyance rollers disposed downstream from the fixing device 9, and ejected to a sheet ejection tray. The sheet ejection tray is disposed outside the image forming apparatus 100.

The configuration of the fixing device 9 including the first charge eliminating brush 26 and the second charge eliminating brush 27 (or the single charge eliminating brush 28) is applied to the image forming apparatus 1 described above, thus preventing an electrical problem in the fixing device 9 and the periphery thereof (e.g., the transfer portion C upstream from the fixing device 9 in the sheet conveyance direction). Such a configuration can restrict, for example, propagation of AC components of the AC power supply toward the transfer portion C. Such a configuration can also remove electric charges on the surface layers of the fixing belt 20 and the pressure roller 21. Such a configuration can also prevent leakage of the transfer current from the transfer portion C to the pressure roller 21.

The sheets P serving as recording media may be thick paper, postcards, envelopes, plain paper, thin paper, coated paper, art paper, tracing paper, overhead projector (OHP) transparencies, plastic film, prepreg, copper foil, and the like.

A heating device according to the present disclosure is not limited to the fixing device described in the above embodiments. The heating device according to the present disclosure is also applicable to, for example, a heating device such as a dryer to dry ink applied to the sheet, a coating device (a laminator) that heats, under pressure, a film serving as a covering member onto the surface of the sheet such as paper, and a thermocompression device such as a heat sealer that seals a seal portion of a packaging material with heat and pressure. Thus, an electrical problem occurring in the heating device or the periphery thereof can be prevented.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Further, the number, position, shape, and so forth of components are not limited to those of the present embodiment, and may be the number, position, shape, and so forth that are suitable for implementing the present invention.

This patent application is based on and claims priority to Japanese Patent Application No. 2021-077673, filed on Apr. 30, 2021, in the Japan Patent Office, the entire disclosure of which is hereby incorporated by reference herein.

REFERENCE SIGNS LIST

1 Image forming apparatus
9 Fixing device (heating device)
20 Fixing belt (heating rotator or member)
**20*a*** Base body (conductive layer)
**20*b*** Elastic layer
**20*c*** Release layer
21 Pressure belt (pressure rotator)
**21*c*** Release layer
22 Heater (heating body)
26 First charge eliminating brush (charge eliminator)
27 Second charge eliminating brush (charge eliminator)
30 Base
40 Resistive heat generator
45 First resistor
46 Second resistor
N1 Fixing nip (nip portion)
N2 Transfer nip (nip portion or transfer portion)
X Longitudinal direction
Y Short direction

The invention claimed is:

1. A heating device, comprising:

a planar heater including a base and a resistive heat generator;

a heating rotator configured to contact the planar heater, the heating rotator including a conductive layer;

a pressure rotator configured to press the heating rotator, the pressure rotator having an outer surface including a conductive material; and one or more charge eliminators configured to contact the conductive layer and the outer surface of the pressure rotator.

2. The heating device according to claim 1, further comprising:

a ground resistor configured to ground the one or more charge eliminators.

3. The heating device according to claim 2, further comprising:

a plurality of resistors, the plurality of resistors including the ground resistor, wherein the one or more charge eliminators include a first charge eliminator configured to contact the conductive layer, and a second charge eliminator configured to contact the outer surface of the pressure rotator, and the plurality of resistors are configured to ground the first charge eliminator and the second charge eliminator.

4. The heating device according to claim 3, wherein the plurality of resistors includes a first resistor and a second resistor;

the the first resistor is configured to ground the first charge eliminator;

the second resistor is configured to ground the second charge eliminator; and a resistance value of the second resistor is greater than a resistance value of the first resistor.

5. The heating device according to claim 4, further comprising:

a fixing nip; and a transfer portion upstream from the fixing nip, wherein a conveyance distance of a recording medium in a conveyance direction of the recording medium between the fixing nip and the transfer portion is L millimeter, the resistance value of the second resistor is R2 ohm, a resistance value per one millimeter of the recording medium in the conveyance direction is $1\times10^6$ ohms per millimeter, and R2 is set within a range of 0.5×L×1×106<R2<2×L×1×106.

6. The heating device according to claim 1, wherein the one or more charge eliminators include a single charge eliminator configured to contact the conductive layer and the outer surface of the pressure rotator.

7. The heating device according to claim 1, wherein the one or more charge eliminators include a conductive brush.

8. The heating device according to claim 1, wherein a surface resistivity of the outer surface of the pressure rotator is $1\times10^8$ ohms per square or less.

9. The heating device according to claim 1, wherein the heating rotator includes an elastic layer.

10. The heating device according to claim 1, wherein the heating device is a fixing device configured to fix an image on a recording medium using heat.

11. An image forming apparatus comprising the heating device according to claim 1.

* * * * *